United States Patent [19]
Fouilloy

[11] Patent Number: 5,212,384
[45] Date of Patent: May 18, 1993

[54] SYSTEM FOR DETECTING A HOT SPOT IN AN INFRA-RED DETECTED LANDSCAPE

[75] Inventor: Jean-Pierre Fouilloy, Velizy, France

[73] Assignee: Thomson-TRT Defense, Guyancourt, France

[21] Appl. No.: 237,398

[22] Filed: Feb. 5, 1991

[30] Foreign Application Priority Data

Jun. 6, 1980 [FR] France .................. 80 12639

[51] Int. Cl.$^5$ ............... F41G 7/00; G02B 26/10; G01J 1/00; H04N 5/33
[52] U.S. Cl. .................. 250/334; 244/3.11; 244/3.12; 250/339; 250/342; 358/113
[58] Field of Search .......... 244/3.11, 3.12, 3.16; 250/334, 339, 342; 358/113

[56] References Cited

U.S. PATENT DOCUMENTS

| | | | |
|---|---|---|---|
| 3,451,254 | 6/1969 | Maley | 250/339 |
| 3,478,212 | 11/1969 | Turck | 244/3.12 |
| 3,796,396 | 3/1974 | Crovella | 244/3.11 |
| 3,943,277 | 3/1976 | Everly | 358/125 |
| 4,160,164 | 7/1979 | Nakauchi | 250/339 |
| 4,220,857 | 9/1980 | Bright | 250/340 |
| 4,247,059 | 1/1981 | Duke et al. | 244/3.12 |

*Primary Examiner*—Stephen C. Buczinski
*Attorney, Agent, or Firm*—Stevens, Davis, Miller & Mosher

[57] ABSTRACT

A system for detecting a hot spot in an infra-red detected landscape and which co-operates with a landscape scan system for converging towards an infra-red detector circuit a main beam emanating seriatim from various regions of the landscape; the system being characterized in that it comprises: optical filter means for preparing from the main beam consecutively in time at least two secondary beams each representing a part of the main beam spectrum; and a signal comparison circuit having an input connected to the detector circuit and whose output is the output of the system and which serves to compare the detector circuit signals corresponding to the various received secondary beams.

4 Claims, 3 Drawing Sheets

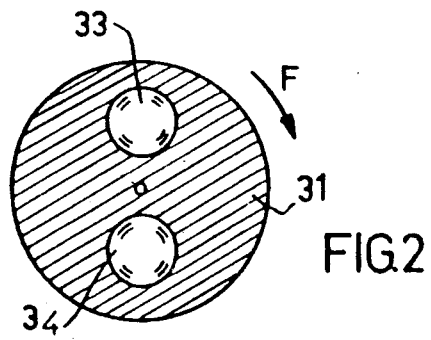
FIG.2
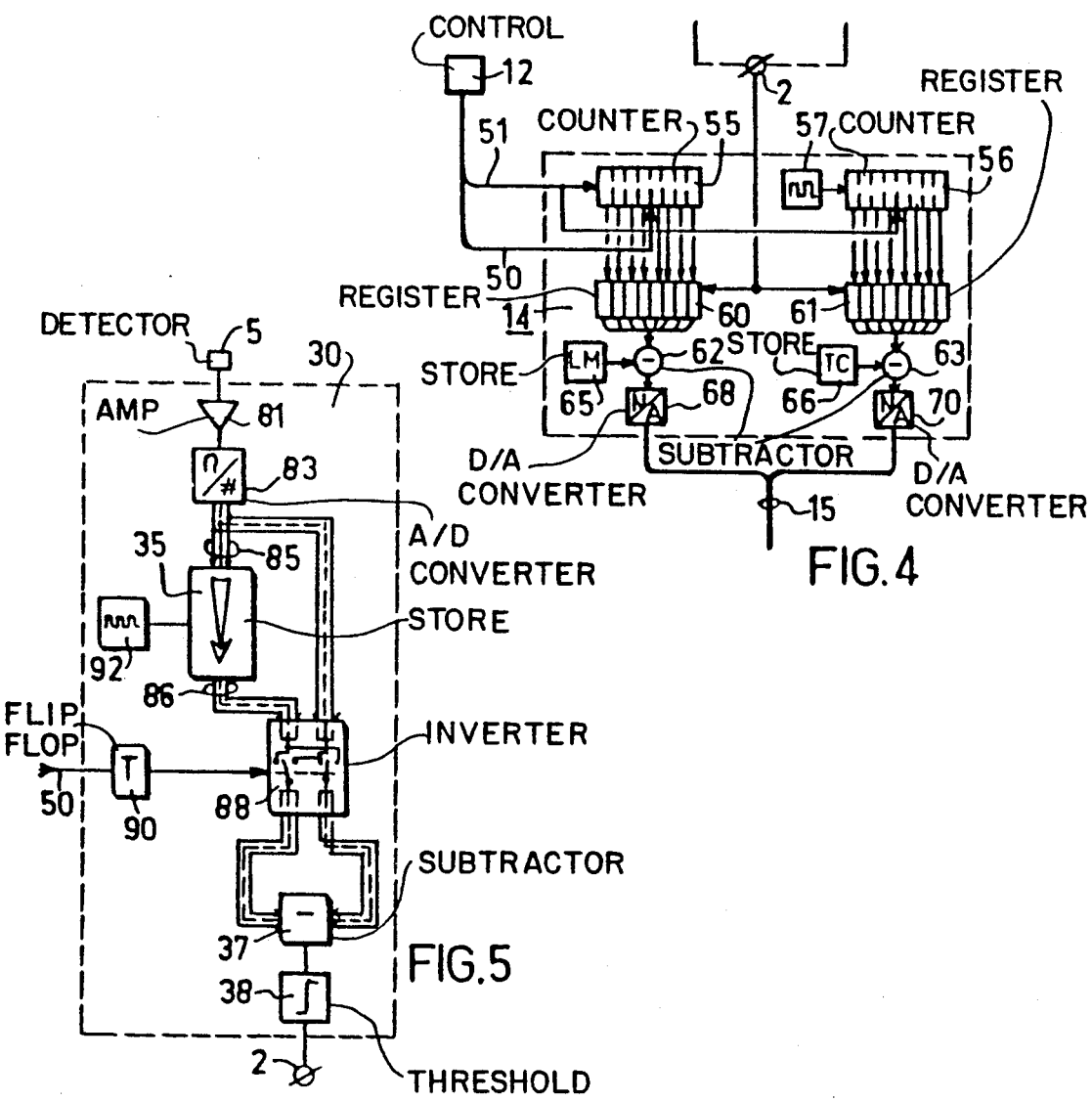
FIG.4
FIG.5

SYSTEM FOR DETECTING A HOT SPOT IN AN INFRA-RED DETECTED LANDSCAPE

The invention relates to a system for detecting a hot spot in an infra-red detected landscape in co-operation with a landscape scan system for converging towards an infra-red detector circuit a main beam emanating seriatim from various regions of the landscape.

The invention also relates to a facility having such a system and serving to guide a missile on to a target.

The infra-red radiation concerned is distant infra-red having a wavelength of more than 1 micron. For satisfactory observations the transparency of the atmosphere must be considered at wavelengths of such an order. In practice two bands are used, one between 3.5 and 5 microns and the other between 8 and 13 microns.

When it is required to detect a hot spot at a temperature e.g. of 1500° K in a landscape in which the average temperature is 300° K, the following difficulties arise.

The landscape can be observed in the first band. The 1500° K hot spot then has maximum luminance L λ. However, the contrast between hot spot luminance and the luminance of the various parts of the landscape is excessive. The hot spot causes the detector circuit to produce a response which spreads in time at a level such as to mask the response of other parts of the landscape. The hot spot is therefore observed as a spot which blots out details of the landscape.

The landscape can be observed in the second band where there is less contrast, but if the hot spot is observed at an angle less than the angle of the elementary field scanned by the landscape-scanning system, the apparent luminance of the hot spot decreases in proportion to the square of the distance, and so a hot spot very far way ceases to be perceptible.

Another possibility would be to work in both bands, using the first just to detect the hot spot and the second to observe the landscape. In this event difficulties arise with the landscape-scanning system since it is difficult to devise a system operating satisfactorily on both bands simultaneously.

The invention proposed a system of the kind hereinbefore described which is free from these difficulties.

In accordance with the invention therefore, a system for detecting a hot spot in an infra-red detected landscape comprises: optical filter means for preparing from the main beam consecutively in time at least two secondary beams each representing a part of the main beam spectrum; and a signal comparison circuit whose input is connected to the detector circuit and whose output is the output of the system and which serves to compare the detector circuit signals corresponding to the various received secondary beams.

The invention proceeds from the knowledge that hot spot luminance in the second band decreases in the direction of increasing wavelengths whereas landscape luminance remains substantially constant in the second band. Consequently, if the second band is divided into two through the agency of optical filtering, the comparison circuit reveals the luminance variation in dependence upon wavelength and therefore outputs the signal representing the hot spot.

Of course, a number of bands can be used if necessary, in which event a number of secondary beams are used.

The following description, taken together with the accompanying drawings, the whole being given by way of non-limitative example, will make readily apparent how the invention can be carried into effect.

In the drawings:

FIG. 2 shows the filter carrier forming part of the system shown in FIG. 1;

FIG. 4 is a detailed view showing a guiding circuit forming part of the system shown in FIG. 1, and FIG. 5 shows a first embodiment of a comparison circuit of use for the system shown in FIG. 1.

Figure 1:
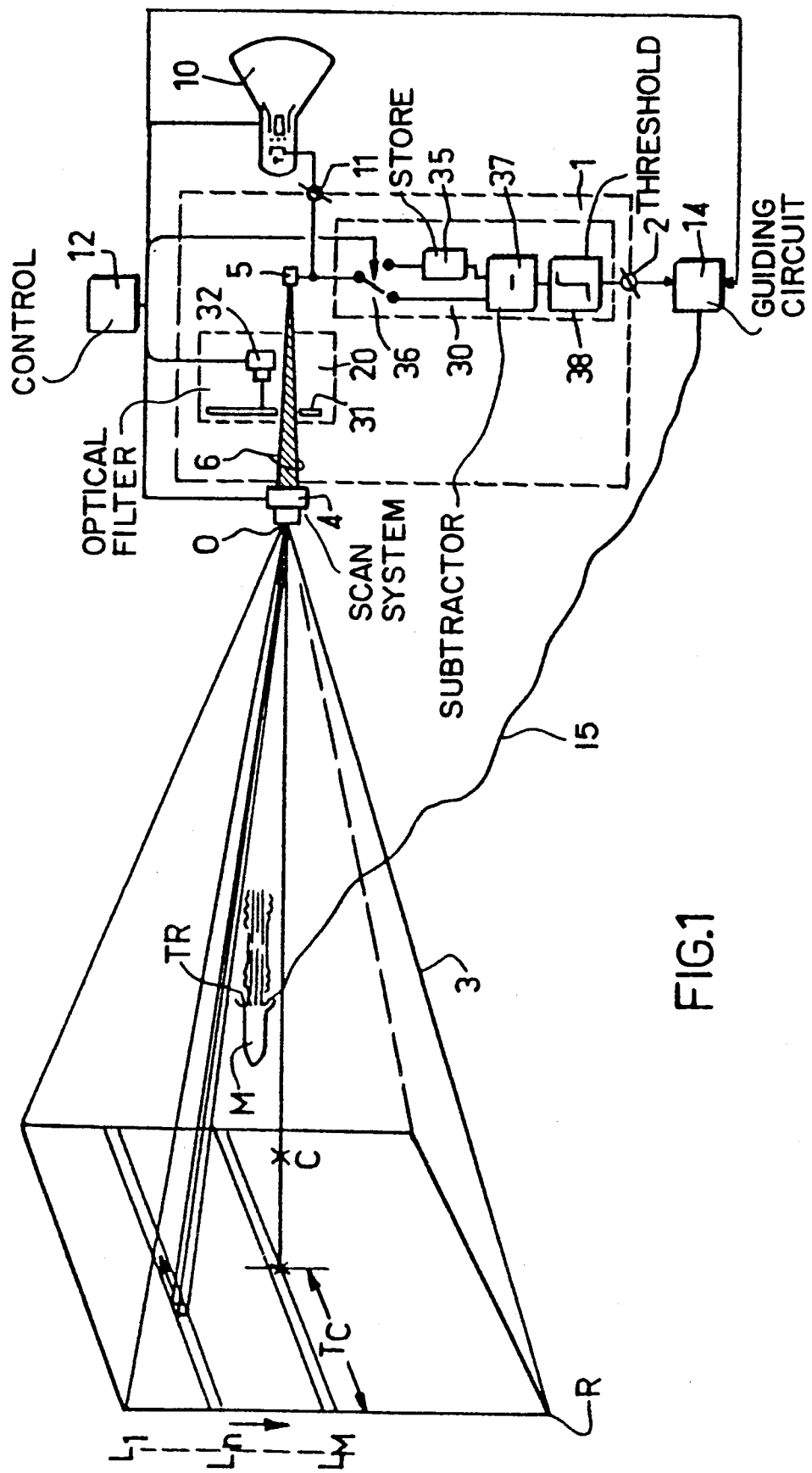
FIG. 1 shows a system for guiding a missile on to a target comprising a facility for detecting a hot spot in infra-red scanned landscape in accordance with the invention.

FIG. 1 shows a system for guiding a missile M on to a target C. The system has a hot spot detecting facility 1, detection of a hot spot manifesting as a signal at output terminal 2 of system 1. In this case the hot spot is a tracer TR which has been secured to the nozzle of the missile M and which is at a temperature of substantially 1500° K.

The missile M and the target C form part of a landscape bound in FIG. 1 by a pyramid 3 whose apex O corresponds to the optical centre of the landscape scan system 4 and whose base is a rectangle R.

To detect infra-red radiations of a wavelength more than the order of 1 micron, vidicon systems cannot be used and so detector circuits comprising a limited number of radiation-sensitive elements are used. To scan a landscape with this kind of radiation, therefore, a spot-by-spot scanning is necessary.

By means of the landscape-scan system 4 a main beam 6 coming from various regions of the landscape is caused to converge on a detector circuit 5 which will be assumed for the time being to consist of a single element. The scan or analysis is carried out on an image-by-image basis and each image is analyzed on a line-by-line basis starting with the line Ll, . . . , Ln, . . . , LM, . . . , these lines being represented on the rectangle R. A landscape scan system of this kind is described in French patent specification No. 2,245,970 filed in the Applicant's name. The detector circuit 5 outputs a signal whose amplitude depends on the luminance of the perceived object. The signal can be used, for instance, to display the landscape on the screen of a cathode ray tube 10 whose cathode is connected to output terminal 11 of system 1; a control facility 12 outputs signals to control the analysis of the system 4 and to deflect the electron beam of tube 10 so that there is strict synchronism between the scans of the landscape and the surface of the tube 10.

To guide the missile M a graticule or lattice is provided which is seen as an overprint on the displayed image; the cross-hairs of the graticule coincide with the target seen on the screen. The axis OC in the landscape corresponds to these cross-hairs. The same are defined by a scan line LM and by a time TC at which the scan lines start. Consequently, the hot spot corresponding to the missile is detected in a different line and at a different time, and so by means of a guiding circuit 14 which determines the coordinates of the hot spot the missile M can be guided on to the target C by guide signals being transmitted to a wire 15 connecting the missile M to the guiding circuit 14.

In accordance with the invention, the hot spot detector system 1 comprises: optical filter means 20 for preparing from the main beam consecutively in time at least two secondary beams each representing a part of the main beam spectrum, the main beam wave band being between 8 and 13 microns (a first secondary beam representing the part between 8 and 10.5 microns and the second secondary beam representing the part from 10.5 to 13 microns); and a comparison circuit 30 having one input connected to the detector circuit 5, the output of circuit 30 forming the output 2 of the system. The circuit 30 serves to compare the detector circuit signals corresponding to the various received secondary beams.

The optical facility 20 comprises a circular filter carrier 31. It can be seen end-on in FIG. 2 and in side elevation in FIG. 1. Filter carrier 31 is driven by a motor 32 to perform consecutive half-revolutions in the direction indicated by an arrow F. Consequently, filters 33, 34 near the periphery of carrier 31 are interposed consecutively in the path of the main beam to produce two secondary beams which converge on the detector circuit 5. The secondary beam issuing from filter 33 is in the waveband of from 8 to 10.5 microns and the secondary beam issuing from the filter 34 is in the waveband of from 10.5 to 13 microns, and so the detector circuit must of course be sensitive to the whole band from 8 to 13 microns.

The optical means are operated as follows:

An image is "seen" by the detector circuit 5 through the filter 33, a second image is seen through the filter 34, the next through the filter 33 and so on.

The job of the comparison circuit is to compare two consecutive images, one as seen through one filter and the other as seen through the other filter. Accordingly, the comparison circuit has a store 35 for storing all the data about the images seen e.g. through filter 33. The input of store 35 is connected to detector circuit 5 by way of a contact of a selector 36. A first input of a subtraction element 37 is also connected to detector circuit 5 by way of another contact of selector 36. Selector 36 is operated synchronously with the carrier 31 by signals output by the control facility 12, so that when the filter 33 is in position the input of store 35 is connected to the detector circuit 5, whereas when the filter 34 is in position the first input of element 37 is connected to the detector circuit. The capacity of the store 35 is such that the same can store all the elements relating to one image. After every second image the subtraction element 37, whose second input is connected to the output of store 35, forms the difference between the elements of one image and the corresponding elements of the other image. When this difference exceeds a threshold determined by a threshold circuit 38, this is an indication that the hot spot has been detected.

Figure 3:
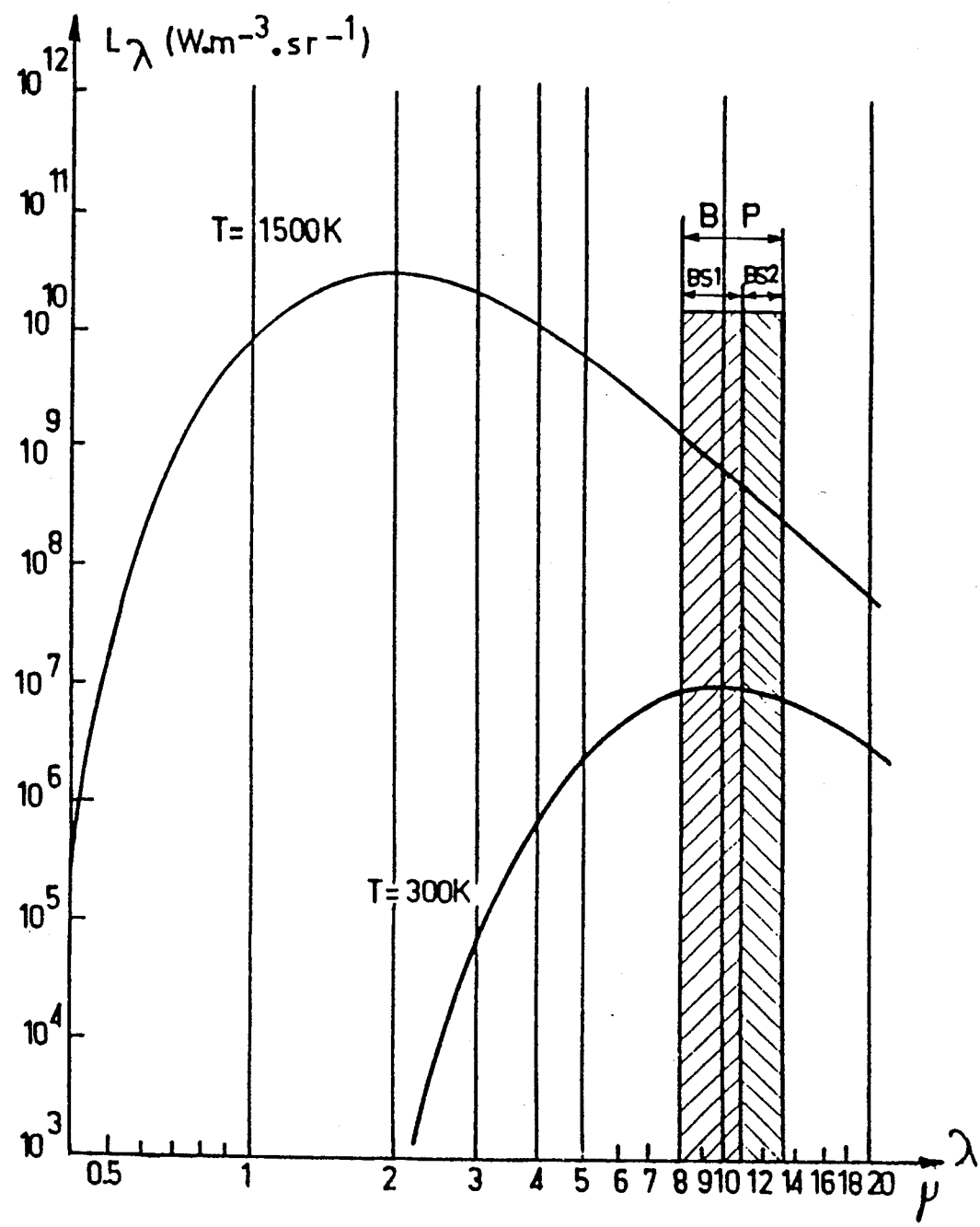
FIG. 3 shows luminance curves.

To explain the operation of the system 1, FIG. 3 shows various luminance curves $L_\lambda$ independence upon the wavelength $\lambda$ and at temperatures of 300° K. and 1500° K. Logarithmic scales are used for the coordinates. The luminance curves are given by the well-known Planck formula. The hatched zone represents the band BP of the 8–13$\mu$ spectrum in which the system operates; this band is subdivided into two secondary bands BS1 and BS2, the first extending from 8 to 10.5$\mu$ and the second from 10.5 to 13$\mu$. Consideration of the luminance of a hot spot having a temperature of 1500° K. shows that it varies from $1.5 \cdot 10^9$ W.m$^{-3}$.sr$^{-1}$ to $6.25 \cdot 10^8$ W.m$^{-3}$.sr$^{-1}$ in the first secondary band and from the latter value to $2.9 \cdot 10^8$ W.m$^{-3}$.sr$^{-1}$ in the second secondary band BS2, whereas the luminance of a point having a temperature of 300° K.—i.e., the average temperature—varies from $9.08 \cdot 10^6$ W.m$^{-3}$.sr$^{-1}$ to $9.79 \cdot 10^6$ W.m$^{-3}$.sr$^{-1}$ in the first secondary band and from the latter value to $8.2 \cdot 10^6$ in the second secondary band. Clearly, therefore, the energy contribution of the hot spot is different in each of the two bands whatever its distance, whereas the energy contribution of the 300° K. spots is substantially the same in both bands. This discrepancy is revealed by the comparison circuit 30. The threshold circuit 38 outputs the hot point signal whenever a definite discrepancy is detected.

FIG. 4 shows in detail the guiding circuit 14. Frame sync signals corresponding to the beginning of the scanning of an image and line sync signals are derived from control circuit 12. These signals are available on waves 50, 51 respectively and are used for the guiding circuit 14. The same comprises a first counter 55 which counts lines. Accordingly, its counting input is connected to line 51 and it is zero reset by the signals available on wire 50. A second counter 56 indicates the time elapsing from the start of a line. Accordingly, it counts the signals of a timer 57 which has a high frequency relatively to the line frequency. The zero resetting input of counter 56 is connected to wire 51 for zero resetting at the start of each line. Two registers 60, 61 are provided and their parallel inputs are connected to the outputs of counters 55, 56 respectively. The write-in inputs are connected to terminal 2 in the event of a hot spot signal, and so when a hot spot signal appears the contents of counters 55, 56 are transferred into registers 60, 61. Subtraction elements 62, 63 serve to calculate the difference of the coordinates of the missile M relatively to the target C from the value corresponding to the line LM on which the cross-hairs are disposed and from the value corresponding to the time TC where the cross-hairs are also disposed. These values are stored in stores 65, 66. Two digital-analog converters 68, 70 convert the output signals of the elements 62, 63 to transmit them over wire 15 to missile M so that the same can correct its trajectory in order to reach its target M.

The comparison circuit 30 shown in FIG. 5 consists in this case of a digital store 35. It provides hot spot data in a quicker sequence than the circuit shown in FIG. 1. The signals from detector circuit 5 are amplified by an amplifier 81, then converted into digital signals by means of an analog-to-digital converter 83. Store 35 behaves like a shift register; it has an input 85 for receiving data from the output of converter 83 and an output 86 outputting the data previously stored. Here again the capacity of store 35 corresponds to the number of spots processed in one image. An inverter 88 makes it possible to apply, when in its first position, the output signals of converter 83 to the first inputs of the subtraction element 37 and the output signals of store 35 to the second inputs of element 37, while when the inverter 88 is in its second position the output signals of store 86 are applied to the first inputs of element 37 and the output signals of converter 83 to the second inputs. The positions of inverter 88 are determined by the state of a flipflop 90, the same changing its state on the appearance of each operative signal transmitted over wire 50. The comparison circuit 30 of FIG. 5 also comprises a timer or clock 92 controlling the shift of the store 35.

Circuit 30 operates as follows:

The rotation of half a revolution of the filter carrier 31 corresponds to each appearance of an operative signal on wire 50, so that the detector circuit 5 receives seriatim the beams issuing from the filters 33, 34, as hereinbefore described. Considering the instant of time when operative signal appears on the wire 50 and assuming that a half-revolution of the filter carrier 31 bringing the filter 33 into the path of the main beam 6. corresponds to the appearance of such signal, the data about the image seen through filter 33 are stored in store 35. Another operative signal then appears on wire 50, coinciding with the filter 34 being in position. Flipflop 90 is in a first state such that the first inputs of the element 37 are connected to the outputs of converter 83 by way of the inverter 88 and the second inputs are connected to the outputs 86 of store 35. The element 37 subtracts the data of the image seen through the filter 34 from the data of the image seen through the filter 33 and contained in the store 35. When the next operative signal appears on the wire 50, the store 35 is filled with data about the image seen through filter 34. The flipflop 90 changes over into its second state so that the first inputs of element 37 are connected to outputs 86 and the second inputs to the outputs of converter 83, and so the same substraction is effected.

I claim:

1. A system for detecting a hot spot in a infra-red detected landscape comprising:

a landscape scan system for converging a main optical beam emanating from various regions of said landscape onto an infra-red detector circuit; an optical filter means interposed in the path of said main beam for producing from said main beam consecutively in time at least two secondary beams each representing a part of the main beam spectrum; and, a signal comparison circuit having an input connected to said detector circuit for comparing the detector circuit output signals corresponding to the received secondary beams and providing an output signal representing the results of the comparison, said signal comparison circuit comprising analog-to-digital converter means for converting signals from said detector circuit into digital signals, a digital store for storing said digital signals representing at least one of said secondary beams, a subtraction element for forming the difference between the data in the store and the data supplied by the detector circuit representing the other secondary beam, inverter means switchable from a first position to a second position, means for changing the positions of said inverter means such that in said first position, output signals from said converter means are applied to first inputs of said substraction element and output signals from the digital store applied to second inputs of the subtraction element, while in said second position of the inverter means, output signals from the digital store are applied to said first inputs of the subtraction element and output signals from the analog-to-digital converter means are applied to the second inputs of the subtraction element.

2. A system according to claim 1, wherein the comparison circuit further comprises a threshold circuit connected to the output of the subtraction element for detecting a major difference between said secondary beams to provide the hot spot information.

3. A system according to claim 1, wherein the optical filter means comprises a circular filter carrier, at least two filters located adjacent the periphery of the filter carrier, means for rotating the filter carrier to interpose the filters successively in the path of the main beam to produce said at least two secondary beams which converge on the detector circuit.

4. A system according to claim 3 wherein the filter carrier carries two filters spaced from each other adjacent the periphery of the carrier such that the image 'seen' by said detector circuit through one filter alternates continuously with the image 'seen' by said detector circuit through the second filter.

* * * * *